Sept. 17, 1935.  R. H. McKEE  2,014,775
PROCESS OF PREPARING SULFITE COOKING LIQUOR
Original Filed Oct. 1, 1929
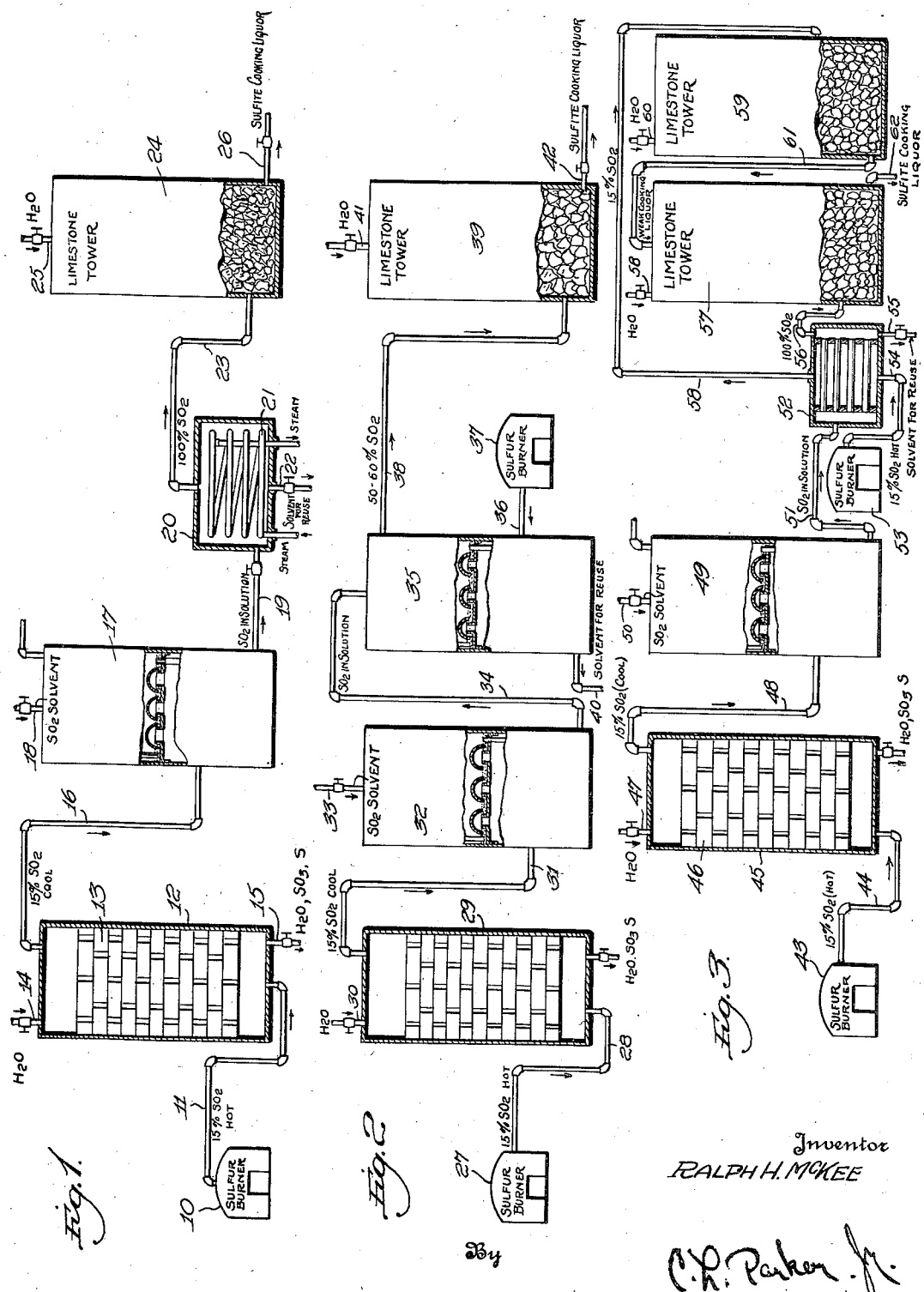
Inventor
RALPH H. McKEE
By
C. L. Parker Jr.
Attorney Patented Sept. 17, 1935

2,014,775

UNITED STATES PATENT OFFICE 2,014,775

PROCESS OF PREPARING SULFITE COOKING LIQUOR

Ralph H. McKee, Jersey City, N. J.

Application October 1, 1929, Serial No. 396,569
Renewed June 9, 1933

6 Claims. (Cl. 23—129)

This invention relates to the preparation of cooking liquor for use in the manufacture of pulp according to the sulfite process.

The principal object of this invention is to provide an economical, efficient and commercially practical process of preparing sulfite cooking liquors of high sulfur dioxide content.

In the making of sulfite pulp for the manufacture of paper and for use as raw material in the making of rayon and other products, wood chips, generally spruce wood, are heated in a steel digester having an acid-proof lining with a solution of a mixture of calcium bisulfite and sulfur dioxide. This solution, which is commonly termed the "cooking liquor", varies somewhat in composition in different mills but a typical example of a sufite cooking liquor is one containing about one per cent. of combined sulfur dioxide, calculated as if present as calcium sulfite $CaSO_3$), and three or four per cent. of free sulfur dioxide. In some instances, magnesia or soda is used instead of lime.

There are several methods in general use for preparing this cooking liquor but the most common is to burn sulfur in a so-called sulfur burner and thereby obtain a gas containing from fourteen to sixteen per cent. of sulfur dioxide. The remainder of the gas is made up primarily of nitrogen although there may be a small amount of oxygen and a trace of sulfur trioxide present. The sulfur burner gas is then cooled and passed up a tower carrying lumps of limestone or dolomite. A slow stream of water is run down through the limestone tower and under the conditions present a solution containing about one per cent. of combined sulfur dioxide and about two or three per cent. of free sulfur dioxide is obtained, carbon dioxide and nitrogen escaping from the top of the tower. The exact amount of sulfur dioxide present in the solution formed depends upon the temperature of the reacting gases and the water. The crude liquor produced is then strengthened by the cool relief gases from the pulp digester, which relief gases are high in sulfur dioxide content. The resulting cooking liquor which is then ready for use in the digester, contains about one per cent. of combined sulfur dioxide and three or four per cent. of free sulfur dioxide.

Experience has proved that it would be desirable, if practical, to employ a sulfite cooking liquor which is much higher in free sulfur dioxide than the liquors commonly employed. In fact, some plants have installed refrigerating systems for the purpose of increasing the percentage of free sulfur dioxide in the cooking liquor but this modification of the process has been unduly expensive as will be apparent. If it could be made economically, many sulfite pulp plants would use a cooking liquor containing about one per cent. of combined sulfur dioxide and at least five or six per cent. of free sulfur dioxide. It is with the preparation of such a cooking liquor that this invention is primarily concerned, the process hereinafter described being an economical and at the same time, commercially practical method of preparing sulfite cooking liquors of high sulfur dioxide content.

In the accompanying drawing, I have shown in diagrammatic form three modifications of apparatus which may be employed in the practice of my process. In its broad aspect, my process comprises dissolving sulfur burner gas, which has been cooled, in a strong solution of a salt which in concentrated condition is capable of dissolving substantially more sulfur dioxide than will be dissolved in the same amount of water at the same temperature, whereby a strong salt solution of sulfur dioxide is obtained. Thereafter the resulting salt solution is heated to expel the dissolved gas which contains about one hundred per cent. sulfur dioxide. This gas is then passed upwardly through a tower containing limestone, dolomite or other material capable of forming with a portion of the sulfur dioxide, an alkali-forming metal sulfite or sulfites of the type used in sulfite cooking liquors, a stream of water being slowly run through the limestone tower counter-currentwise to the flow of the gas through the tower. The resulting solution is drawn off from the bottom of the limestone tower and is in condition for use in a sulfite pulp plant. Because of the concentration of sulfur dioxide by dissolving it in a solution capable of dissolving it in large proportions, the gas which is expelled from the solution by heating is in relatively large volume and contains approximately one hundred per cent. sulfur dioxide, and when this gas is passed through the tower containing the basic metal material a sulfite cooking liquor is produced which is materially higher in sulfur dioxide content than any of the cooking liquors commonly employed in commercial practice.

In selecting a solvent for the sulfur dioxide, it is important that the solvent be adapted to take up large amounts of the gas without taking up any substantial amount of the other gases present therewith in sulfur burner gas.

I have discovered that strong solutions of certain salts of organic acids are particularly suitable for use in the practice of the process. For example, an approximately saturated solution of sodium cymene sulfonate will dissolve much more sulfur dioxide than can be dissolved in an equal amount of water at the same temperature, and a strong solution of this salt may be satisfactorily used in the practice of the process. However, I prefer to employ a strong solution of an alkali sulfo-cyanide, preferably the potassium salt. Potassium sulfo-cyanide in saturated solution will dissolve between seven or eight times as much sulfur dioxide as will water at the same temperature. Both of the organic salts specified are readily soluble in water whereby relatively concentrated aqueous solutions of the salts may be prepared, and either may be used with particularly advantageous results but it is to be understood that my invention is not limited to these particular compounds since I may employ a solution of any salt which will dissolve a materially greater amount of sulfur dioxide than will an equal amount of water at the same temperature.

Referring to Figure 1 of the drawing, sulfur-burner gas is produced in the usual manner in a sulfur burner 10 and this gas, which contains about fifteen per cent. of sulfur dioxide is passed through the pipe 11 into the lower portion of a scrubber 12 which is provided with checker work 13. The hot gas passes upwardly through the scrubber 12 in contact with a counter current of water which is admitted into the scrubber through the pipe 14. The amount of water used in the scrubber 12 is such that at its discharge through the pipe 15 it is approximately about boiling temperature and accordingly it will carry substantially no dissolved sulfur dioxide to waste. However, the water serves to cool the gas and to free it from sulfur trioxide and any entrained sulfur. The cool gas is then passed through the pipe 16 into a plate and cap column 17 where it tends to pass upwardly in contact with a sulfur dioxide solvent of the character hereinbefore referred to which is introduced into the tower 17 through the pipe 18. The resulting solution of sulfur dioxide is then drawn off through the pipe 19 and passed into a heater 20 where the solution is heated preferably by means of a steam coil 21 to degasify the solution. The remaining solvent is drawn off as at 22 for further use in the practice of the process and the substantially pure sulfur dioxide gas is carried by the pipe 23 to the lower portion of a tower 24 containing limestone, dolomite, milk of lime, or like material capable of reacting in the presence of water with sulfur dioxide to form an alkali-forming metal sulfite suitable for use in a sulfite cooking liquor. A slow stream of water is introduced into the tower 24 through the pipe 25 and the resulting cooking liquor is drawn off as at 26 and is ready for use in the customary way in the paper pulp plant.

A particularly economical lay-out is shown in the modification illustrated in Figure 2 of the drawing. Referring to Figure 2, sulfur burner gas is produced in the sulfur burner 27, carried through the pipe 28 and passed upwardly through the scrubber 29 where it is cooled and partially purified in the manner suggested in connection with the description of the modification shown in Figure 1 by water introduced into the scrubber through the pipe 30. The cool gas is then passed through the pipe 31 into a plate and cap column or tower 32 where it is intimately mixed with a sulfur dioxide solvent of the character referred to above which it passed downwardly through the tower from the pipe 33. The resulting solution is then pumped through the pipe 34 and discharged into the upper portion of a second plate and cap column or tower 35, into the lower portion of which is introduced through the pipe 36 hot sulfur burner gas from a second sulfur burner 37. The hot gas from the burner 37 serves to degasify the solution in the column 35 and to form a mixture containing approximately from fifty to sixty per cent. of sulfur dioxide which is passed through the pipe 38 into a tower 39. The degasified solvent from the column 35 is discharged through the pipe 40 for further use in the practice of the process. The gas discharged from the column 35 is passed upwardly through the tower 39 in contact with a slow stream of water from the pipe 41 and an alkali-forming metal compound or compounds of the character hereinbefore referred to. The resulting strong sulfite cooking liquor is drawn off through the pipe 42 for use as described.

Another economical lay-out is suggested in Figure 3. Referring to this figure, sulfur burner gas produced in the sulfur burner 43 is passed through the pipe 44 into the scrubber 45 where it passes upwardly through the checker work 46 in contact with water admitted through the pipe 47 at the rate suggested above. The thus cooled and partially purified gas is then passed through the pipe 48 into a plate and cap column or tower 49 where it is intimately mixed with the sulfur dioxide solvent of the character referred to above which is admitted into the upper portion of the column through the pipe 50. The resulting solution is withdrawn through the pipe 51 and passed into a heat interchanger 52 where it is degasified by hot sulfur burner gas produced in the burner 53 and passed into another portion of the interchanger by means of the pipe 54. The degasified solvent is withdrawn through the pipe 55 for further use in the practice of the process and the high content sulfur dioxide gas is withdrawn from the interchanger through the pipe 56 and passed upwardly through a limestone tower 57 in contact with water from the pipe 58 and limestone or equivalent material disposed therein. The sulfur burner gas from the burner 53 is discharged from the heat interchanger 52 through the pipe 58 and is passed into a second limestone tower 59 in contact with water from the pipe 60 and limestone or equivalent material disposed therein. The resulting weak sulfite liquor is pumped from the lower portion of the tower 59 through the pipe 61 into the upper portion of the tower 57 wherein it passes downwardly with the water from the pipe 58 and is mixed with the sulfite liquor formed by the passage of the sulfur dioxide into the tower from the pipe 56. The resulting cooking liquor is withdrawn through the pipe 62 for use as described.

In the foregoing description of the process only one tower for adsorption of the strong sulfur dioxide gas is mentioned but it is to be understood, that, if the engineer in charge so wishes, two towers may be used instead of one to facilitate complete adsorption.

In the foregoing description of the process no apparatus for the cooling of the adsorption liquids is described but it is to be understood that, when cooling of the adsorption liquids is desired, the heat evolved by the adsorption of the sulfur dioxide gas may be removed by customary methods, e. g. by coils carrying cooling water or by other heat exchange apparatus.

In the new process the cooled relief gases from the pulp digester, which relief gases are high in sulfur dioxide content, may be reused by introduction into the strong sulfur dioxide line at a point preceding the limestone tower or into the sulfite cooking liquor after it has passed from the limestone tower.

From the foregoing it will be apparent that I have devised a simple and economical process of preparing sulfite cooking liquors of high sulfur dioxide content without resorting to the use of expensive or troublesome equipment and without employing refrigerating apparatus.

Where the term "sulfite cooking liquor" is employed in the claims, it is to be understood that this term means a cooking liquor which is adapted for use in the digesting of wood chips to make pulp according to the so-called sulfite process.

The term "sulfite" as used in the claims is intended to cover a normal sulfite, acid sulfite or similar compound commonly employed in sulfite cooking liquors. Similarly the term "alkali-forming metal" covers the true alkaline earth and alkali metals and also ammonium.

In the practice of the process, it is to be understood that in place of sulfur burner gas as produced by burning sulfur in a sulfur burner, a similar synthetically prepared gaseous mixture may be used if desired.

While pumps, gages, thermometers and the like have not been shown in the drawing, it is to be understood that such devices are to be employed where needed or desired.

While I have described in detail the preferred embodiments of my invention it is to be understood that the details of procedure may be widely varied without departing from the spirit of the invention or the scope of the subjoined claims.

I claim:—

1. The process of preparing sulfite cooking liquor of high sulfur dioxide content which comprises contacting cool sulfur burner gas with a strong solution of a salt of an organic acid, a concentrated solution of which is capable of dissolving substantially more sulfur dioxide than an equal amount of water will dissolve at the same temperature, contacting the resulting solution with hot sulfur burner gas to expel sulfur dioxide from said solution, and contacting a mixture of the expelled sulfur dioxide and said sulfur burner gas in the presence of water with an alkali-forming metal compound to convert a portion of the sulfur dioxide present into an alkali-forming metal sulfite.

2. The process of preparing sulfite cooking liquor of high sulfur dioxide content which comprises contacting cool sulfur burner gas with a strong solution of a salt of an organic acid, a concentrated solution of which is capable of dissolving substantially more sulfur dioxide than an equal amount of water will dissolve at the same temperature, contacting a current of the resulting solution with a counter-current of hot sulfur burner gas to expel sulfur dioxide from said solution, and contacting a mixture of the expelled sulfur dioxide and said sulfur burner gas in the presence of water with an alkali-forming metal compound to convert a portion of the sulfur dioxide present into an alkali-forming metal sulfite.

3. The process of preparing sulfite cooking liquor of high sulfur dioxide content which comprises contacting a current of hot sulfur burner gas with a counter-current of water, contacting the thus treated gas with a strong solution of a salt of an organic acid, a concentrated solution of which is capable of dissolving substantially more sulfur dioxide than an equal amount of water will dissolve at the same temperature, contacting the resulting solution with hot sulfur burner gas to expel sulfur dioxide from said solution, and contacting a mixture of the expelled sulfur dioxide and said sulfur burner gas in the presence of water with an alkali-forming metal compound to convert a portion of the sulfur dioxide present into an alkali-forming metal sulfite.

4. The process of preparing sulfite cooking liquor of high sulfur dioxide content which comprises contacting cool sulfur burner gas with a strong solution of an alkali sulfo-cyanide, contacting the resulting solution with hot sulfur burner gas to expel surfur dioxide from said solution, and contacting a mixture of the expelled sulfur dioxide and said sulfur burner gas in the presence of water with an alkali-forming metal compound to convert a portion of the sulfur dioxide present into an alkali-forming metal sulfite.

5. The process of preparing sulfite cooking liquor of high sulfur dioxide content which comprises contacting cool sulfur burner gas with a strong solution of potassium sulfo-cyanide, contacting the resulting solution with hot sulfur burner gas to expel sulfur dioxide from said solution, and contacting a mixture of the expelled sulfur dioxide and said sulfur burner gas in the presence of water with an alkali-forming metal compound to convert a portion of the sulfur dioxide present into an alkali-forming metal sulfite.

6. The process of preparing sulfite cooking liquor of high sulfur dioxide content which comprises contacting a current of hot sulfur burner gas with a counter-current of water, contacting a current of the thus treated gas with a counter-current of potassium sulfo-cyanide, contacting a current of the resulting solution with a counter-current of hot sulfur burner gas to expel sulfur dioxide from said solution, and contacting a mixture of the expelled sulfur dioxide and said sulfur burner gas in the presence of water with an alkali-forming metal compound to convert a portion of the sulfur dioxide present into an alkali-forming metal sulfite.

RALPH H. McKEE.